US008327317B2

(12) United States Patent
Li et al.

(10) Patent No.: US 8,327,317 B2
(45) Date of Patent: Dec. 4, 2012

(54) METHOD AND APPARATUS FOR PROVIDING PROJECT DEVELOPMENT ENVIRONMENT AND PROJECT DEVELOPMENT SYSTEM

(75) Inventors: Shao Chun Li, Beijing (CN); Ying Liu, Beijing (CN); Wei Zhao, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 12/261,008

(22) Filed: Oct. 29, 2008

(65) Prior Publication Data

US 2009/0119638 A1 May 7, 2009

(30) Foreign Application Priority Data

Nov. 5, 2007 (CN) .......................... 2007 1 0165836

(51) Int. Cl.
*G06F 9/44* (2006.01)
(52) U.S. Cl. ....................................................... 717/101
(58) Field of Classification Search .................... 717/101
See application file for complete search history.

(56) References Cited

U.S. PATENT DOCUMENTS

| 5,758,351 | A | * | 5/1998 | Gibson et al. ........................ 1/1 |
| 6,748,380 | B2 | * | 6/2004 | Poole et al. .................... 717/174 |
| 6,757,893 | B1 | * | 6/2004 | Haikin .......................... 717/170 |
| 7,139,999 | B2 | * | 11/2006 | Bowman-Amuah .......... 717/101 |
| 7,152,201 | B2 | * | 12/2006 | Segawa et al. ................ 715/201 |
| 7,174,348 | B1 | | 2/2007 | Sadhu et al. |
| 7,698,636 | B2 | * | 4/2010 | Mohamed ..................... 715/255 |
| 2006/0101092 | A1 | | 5/2006 | Ishida |
| 2006/0168556 | A1 | | 7/2006 | Gikas |
| 2008/0263505 | A1 | * | 10/2008 | StClair et al. ................. 717/101 |
| 2009/0094572 | A1 | * | 4/2009 | Hegde et al. .................. 717/101 |

OTHER PUBLICATIONS

Kumar, et al, "On the use of Connector Libraries in Distributed Software Architectures", ACM SIGSOFT Software Engineering Notes, Jan. 2002, pp. 45-52, vol. 27, No. 1.
Ramanujan, et al, "A Framework for Automated Software Partitioning and Mapping for Distributed Multiprocessors". IEEE, 1996, pp. 138-145.

* cited by examiner

*Primary Examiner* — Wei Zhen
*Assistant Examiner* — Junchun Wu
(74) *Attorney, Agent, or Firm* — William Stock; Anne Vachon Dougherty (57) ABSTRACT

A method for providing project development environment for a developer, an apparatus for providing project development environment for a developer, and a project development system. The method determines an artifact which can be accessed by the developer and an artifact which cannot be accessed by the developer and is depended by the artifact which can be accessed by the developer based on a request of the developer, project assignment information and project artifact dependencies, and generates a logic artifact for the artifact which cannot be accessed by the developer and is depended by the artifact which can be accessed by the developer. The invention improves the security of the project development by generating the surrogate to make sure that every developer can not touch the whole content of the project, and the developer can freely invoke the depended artifacts.

15 Claims, 5 Drawing Sheets

| FoodOrder_Interface_FoodService |  |
|---|---|
| ▶ Operations | |
| Operations and their parameters | |

| Name | Type |
|---|---|
| ▶ check | |
| ⇧ Input(s) timeIntervalBO | TimeIntervalBO |
| ⇧ Output(s) ready | boolean |

| Message | |
|---|---|
| ▶ notifyCollector | |
| ⇧ Input(s) notifyCollectorResponse | string |
| ⇧ Output(s) | string |

METHOD AND APPARATUS FOR PROVIDING PROJECT DEVELOPMENT ENVIRONMENT AND PROJECT DEVELOPMENT SYSTEM

TECHNICAL FIELD

The invention relates to a computer technique, specifically, to a technique for providing project development environment for a developer in a development process of a software project.

TECHNICAL BACKGROUND

At present, development of a software project needs a plurality of developers, even needs a plurality of developers from different fields to cooperate, wherein every developer develops a part of the project.

In the present development process of a software project, Project Management Tool (PMT) is used to partition the project, i.e. partition the project into a number of sub-projects; then Integrated Development Environment (IDE) is used to develop every sub-project, for example a source file is created and amended; at the same time Version Control System (VCS) is used to control the versions of the artifacts generated during the development process, for example updating the version of a source file. Most products of VCS, such as Concurrent Versions System (CVS), ClearCase, and Configuration Management Version Control (CMVC), etc., provide strong capability on version control for a user, such as the operations of check in, check out, etc.

In the process of developing and managing a project by using Integrated Development Environment (IDE) and Version Control System (VCS), every developer develops a sub-project assigned from the whole project under the development environment. However, this working mode does not fit the development of some projects with special requirements. For example, there are problems under two conditions as follows:

1) The project has a high confidentiality requirement, and needs a plurality of developers to develop together. In this case, a project manager does not hope that any developer can touch the whole project; therefore, it is an important problem to make sure that every developer can not obtain the content of the whole project;

2) The project is very complex, and the working task relationships among the different developers are very complex too. Generally, it takes the developers much time to solve the development environment problems caused by the related working tasks of other developers.

For the above-mentioned situations, some possible existing solutions include:

Different development environments are manually prepared and provided for different developers, and the whole project is manually partitioned into a number of different sub-projects, then every sub-project is independently developed, and there are no relationships among these sub-projects. Although the method can make sure that every developer can not obtain the content of the whole project, if the whole project is amended, the sub-projects partitioned before are needed to be manually partitioned again from the whole project. The rework of the partition is very normal in the software project, so with the manual method it is hard to avoid a mass of repeated manual efforts. Furthermore, it is time-consuming and error-prone. In addition, the most important thing is that designs and tests of modules are independent of each other in the manual method. For software whose modules are dependent on each other, it is very inconvenient when a developer tests his/her modules which depend on modules developed by other developers. Therefore, in general cases, the pure manual assignment of a development environment is only adopted in the development process of small scale software projects.

The sub-projects developed by different developers can be controlled according to accessing rights using VCS. For example, Project A is partitioned into sub-project A-1, sub-project A-2, and sub-project A-3. The developer for developing the sub-project A-1 can totally control this sub-project, such as reading, amending and submitting a new version, has the right of reading the sub-project A-2 depended by sub-project A-1, but has no right to access sub-project A-3 which is not depended by sub-project A-1. However, if the developer of sub-project A-1 can read all the details of sub-project A-2 developed by another developer, this solution can not achieve the confidentiality requirement for sub-project A-2. In order to make sure that every developer can not obtain the contents of any sub-project that is not developed by himself/herself and achieve confidentiality requirement, it is needed to limit the right for reading the project not developed by himself/herself. However, in the case that the reading right is completely limited, compiling errors will occur. The reason is that the contents of the project which cannot be accessed but needed by the developer can not be provided for the developer by the project development environment due to access control mechanism. However, the content of other sub-projects which is depended is needed for the developer while compiling. If the compiler can not find codes depended, it will notify an error.

Furthermore, a project partition method is disclosed in a patent document US2006/0168556A1 titled "Engineering system for distributed development and development by a number of users", in which an entirely independent sub-project is partitioned from a whole project and developed by a specific developer. In an actual development process of software, however, a project can not be composed of a plurality of completely independent sub-projects. On the contrary, it can not be avoided that there are dependencies among sub-projects.

Thus, what is needed for a method of providing for a developer the whole development codes without codes that the developer does not need to know. That is to say, the method should be able to make sure that any sub-project obtained by the developer does not contain contents which should not be known by the developer but can be correctly compiled and tested.

SUMMARY OF THE INVENTION

In order to solve the above-mentioned problems which can not be addressed by the prior technologies, the present invention provides a method for providing project development environment for a developer, an apparatus for providing project development environment for a developer, and a project development system.

According to an aspect of the present invention, there is provided a method for providing project development environment for a developer, comprising: determining artifacts which can be accessed by a developer and artifacts which cannot be accessed by the developer but are depended by the artifacts which can be accessed by the developer based on a request of the developer, project assignment information and project artifact dependencies; providing a physical artifact for the artifact which can be accessed by the developer; generating a logical artifact for the artifact which cannot be accessed by the developer but is depended by the artifact which can be accessed by the developer; and sending the physical artifacts and the logical artifacts together to the developer.

According to another aspect of the present invention, there is provided an apparatus for providing project development environment for a developer, comprising: a project artifact filtering unit configured to determine artifacts which can be accessed by the developer and artifacts which cannot be accessed by the developer but are depended by the artifacts which can be accessed by the developer based on a request of the developer, project assignment information and project artifact dependencies; a physical artifact providing unit configured to provide a physical artifact for the artifact which can be accessed by the developer; a logical artifact generating unit configured to generate a logical artifact for the artifact which cannot be accessed by the developer but is depended by the artifact which can be accessed by the developer; and a sending unit configured to send the physical artifacts and the logical artifacts together to the developer.

According to another aspect of the present invention, there is provided a project development system, comprising: a project management tool (PMT) configured to assign a project and provide project assignment information; a version control system (VCS) configured to manage and store artifacts generated in a project development process; an integrated development environment (IDE) configured to develop the project by developers; and the above-mentioned apparatus configured to provide a logical development environment for a developer based on a request of the developer, project assignment information provided by the project management tool and project artifact dependencies.

BRIEF DESCRIPTION OF THE DRAWINGS

It is believed that the above features, advantages and objectives of the invention will be better understood through the following description of the implementations of the invention in conjunction with the accompanied drawings, in which.

DETAILED DESCRIPTION OF THE INVENTION

Next, the detailed description of the preferred embodiments of the present invention will be given in conjunction with the drawings.

Method for Providing Project Development Environment for a Developer

Figure 1:
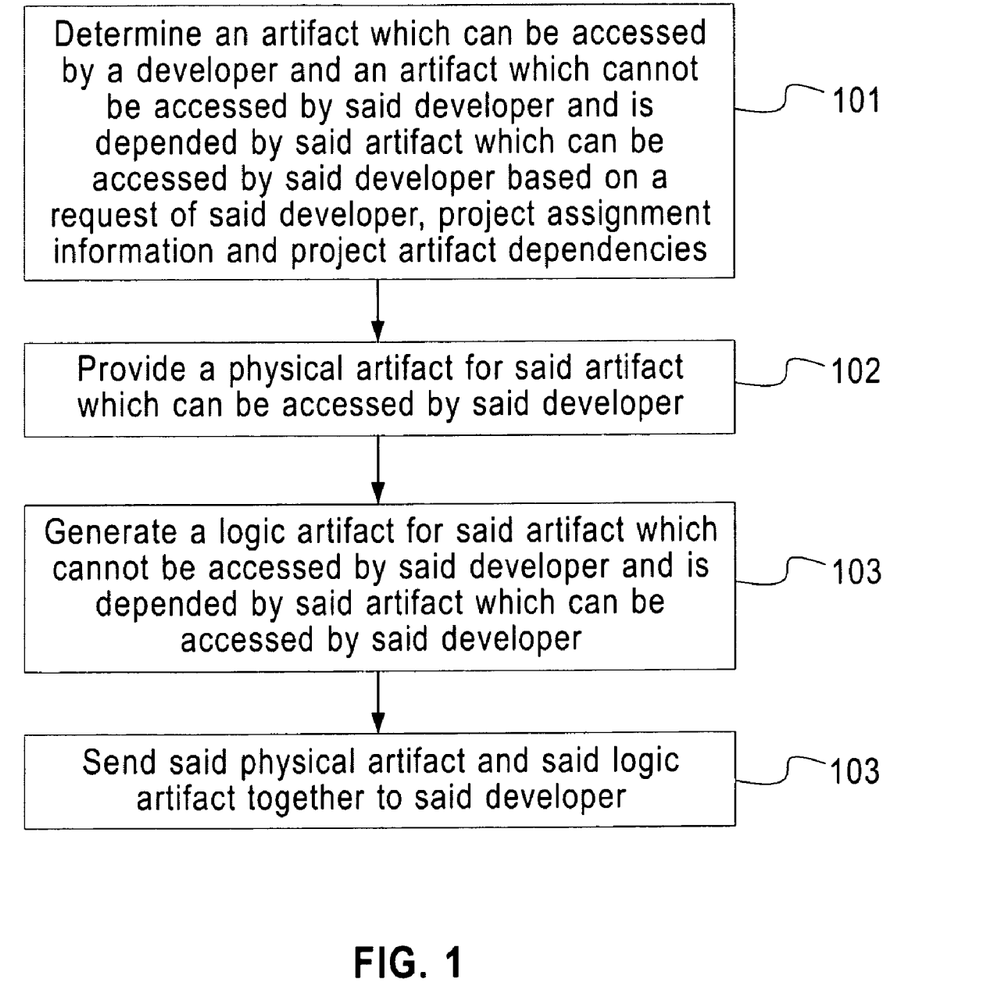
FIG. 1 is a flowchart showing a method for providing project development environment for a developer according to an embodiment of the invention.

FIG. 1 is a flowchart showing a method for providing project development environment for a developer according to the embodiment of the invention. As shown in FIG. 1, first, in step 101, the artifacts which can be accessed by the developer and the artifacts which cannot be accessed by the developer but are depended by the artifacts which can be accessed by the developer are determined based on a request of the developer, project assignment information and project artifact dependencies. Specifically, the request of the developer includes an identity (ID) of the developer or a name of an artifact with the ID of the developer, wherein the name of the artifact is a name of a developed entity, such as an interface, a component/module and a data type and so on. The ID of the developer can be identified based on a user name or an internet protocol (IP) address of the developer; and the present invention has no limitation on this, as long as the ID of the developer can be identified.

In step 101, if the request of the developer includes the ID of the developer, the developer hopes to obtain all artifacts which can be accessed by the developer and all other artifacts which are depended by the artifacts. If the request is the name of the artifact with the ID of the developer, the developer only wants to obtain the particular artifact which can be accessed by the developer and other artifacts which are depended by the particular artifact.

Figure 3:
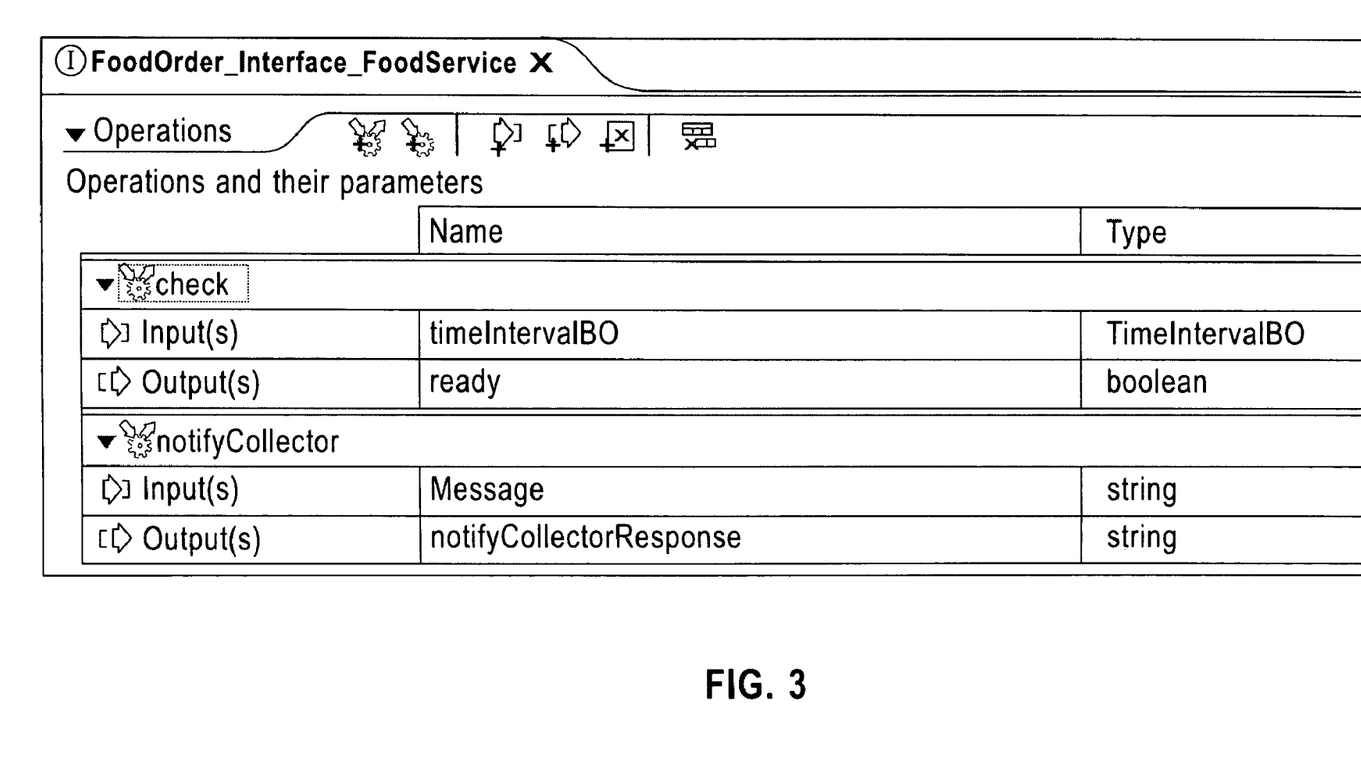
FIG. 3 is an example of a project artifact according to the embodiment of the invention.

In the embodiment, the artifact can be any entity which is produced in the process of the project development, such as an interface, a component/module and data and so on. The interface is a protocol defined for communication between communication parties, which is implemented in the component. The component/module is the source code including application logic to achieve some functions. The data are data to be used by the component. FIG. 3 is an example of a project artifact according to the embodiment of the invention, which shows an interface of FoodOrder_Interface_FoodService. In FIG. 3, "check" and "notifyCollector" are two methods of this interface, and the function of the method of "check" is to check whether there is a need to perform "food order" in given time interval of "timeIntervalBO". The method of "notifyCollector" is to send the prepared "message" to a food order administrator to inform him/her to perform "food order".

Figure 4:
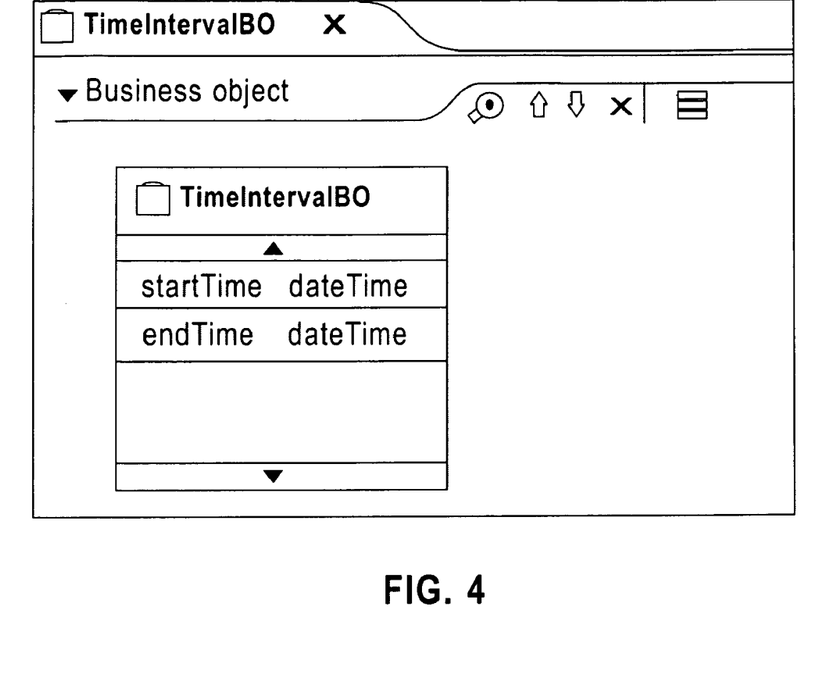
FIG. 4 is another example of a project artifact according to the embodiment of the invention.

FIG. 4 is another example of a project artifact according to the embodiment of the invention, which shows the content of the data of TimeIntervalBO. In FIG. 4, TimeIntervalBO is a data type of a time interval, which is composed of start time and end time, for example, the start time is 10/26/2007 1:00:00 PM and the end time is 10/26/2007 1:30:00 PM.

It should be understood that the examples of the artifacts shown and enumerated here are just for the purpose of description, the present invention has no limitation on it, and the artifact can be any entity which is produced in the process of the project development.

In the embodiment, the project assignment information is the situation about the project partition and the project development. Before the project is developed, an administrator of the project needs to partition the project into a number of sub-projects, which are developed by different developers or different groups of developers. In the process of the project development, a developed artifact corresponds to a developer. Therefore, the project assignment information can be found in a table, as shown in following table 1, which shows who develops which sub-project, i.e., which shows the mapping relationships between developers and artifacts.

TABLE 1

| Developer | Sub-project |
|---|---|
| Alice | FoodProductManagement_Interface_FoodProductChange |
|  | FoodProductManagement_Interface_FoodProductDelete |
| Bob | FoodProductManagement_Interface_FoodProductGet |

It can be seen in the table 1 that the developer Alice is responsible for developing the sub-project FoodProductManagement_Interface_FoodProductChange and FoodProductManagement_Interface_FoodProductDelete, and the developer Bob is responsible for developing the sub-project FoodProductManagement_Interface_FoodProductGet.

Figure 2:
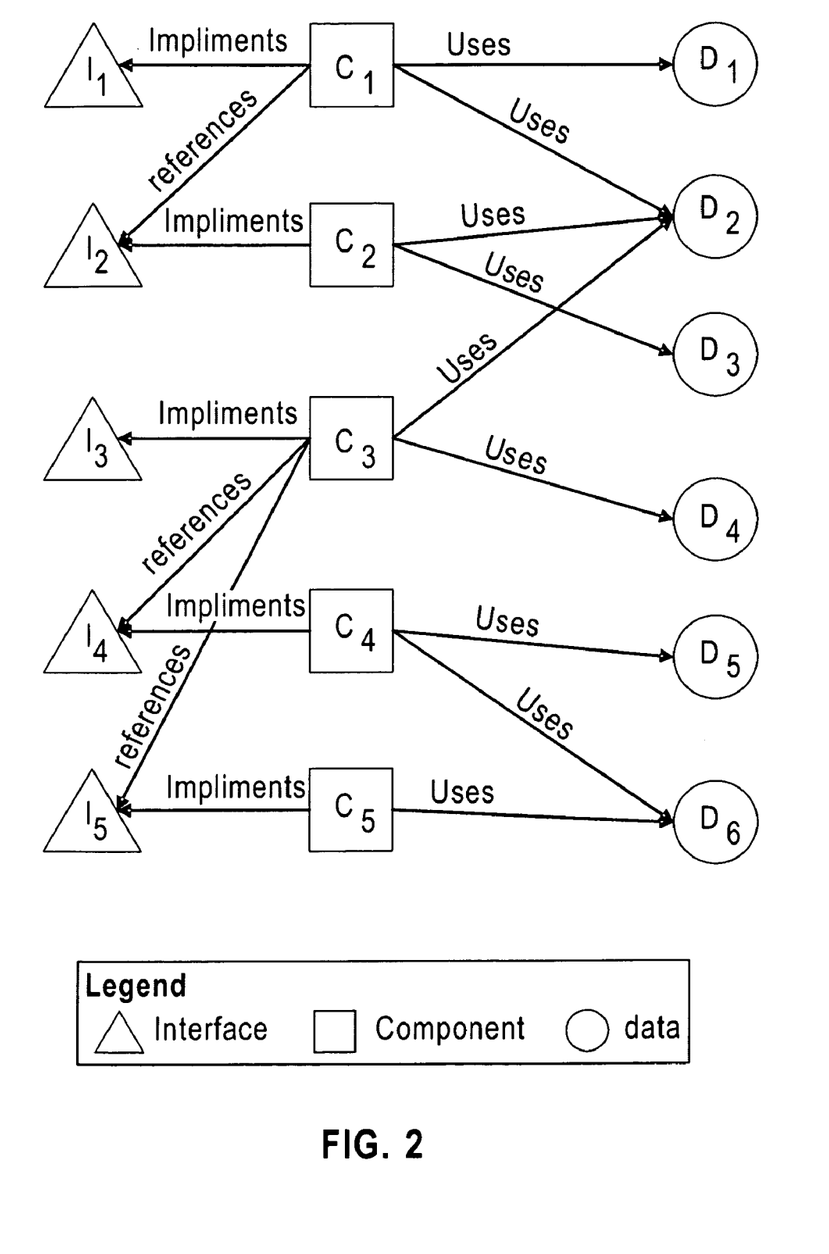
FIG. 2 is an example of project artifact dependencies according to the embodiment of the invention.

In the embodiment, the project artifact dependencies are dependencies among artifacts which are produced in the process of the project development, i.e. invocation relationship among them. FIG. 2 is an example of project artifact dependencies according to the embodiment of the invention. In FIG. 2, it shows the dependencies among interfaces, components and data, for example, component $C_3$ implements interface $I_3$ and references interface $I_4$ and interface $I_5$, and uses data $D_4$ and data $D_5$. It should be understood that FIG. 2 only exemplarily shows dependencies among project artifacts, and the present invention has no limitation on it, for example, it can further include dependencies between data and data, as well as dependencies between an interface and data, etc. It should be understood that it is necessary to generate a surrogate for an artifact directly depended by the artifact but there is no need to generate a surrogate for an artifact indirectly depended by the artifact since it will not affect the implementation of the artifact in the invention.

Next, in step 102, a physical artifact is provided for the artifact which can be accessed by the developer. In particular, the artifact which can be accessed by the developer is searched in a project repository, in which the searched artifact is used as a physical artifact, in which the physical artifact is a developed artifact which can be accessed by the developer and has a corresponding specific physical file in the project repository.

In the embodiment, the project repository is a central storage unit for collectively storing any artifact produced in the process of the project development. Alternatively, the project repository stores not only artifacts themselves but also version information and changing situation of each artifact. Physically, the project repository can be realized by a single server, and also can be realized by a file management system of a version control system (VCS). The present invention has no limitation on the project repository, as long as it can store the artifact, and can provide the artifact when it is needed.

Next, in step 103, a logical artifact is generated for the artifact (the interface $I_1$ shown in FIG. 2) which cannot be accessed by the developer if the artifact (the component $C_1$ shown in FIG. 2) which can be accessed by the developer depends on the running of the artifact (such as $I_1$) which cannot be accessed by the developer.

In particular, the artifact which cannot be accessed by the developer but is depended by the artifact which can be accessed by the developer is searched in the project repository. Then a surrogate is generated for the searched artifact wherein the surrogate is used as the logical artifact.

After the artifact needed to be invoked by the developer is searched, implementation details of the searched artifact are hidden in the surrogate generated in step 103, so that the developer can not see the details of the artifact but can use it. This way will not affect the execution of the artifact which depends on other artifacts.

In particular, the method of generating the surrogate can be achieve by for example the existing method of Java Emitter Templates (JET), the details of which can be seen in the links [1]-[2] as follows:

[1] eclipse.org at jet_tutorial.html
[2] eclipse.org at jet_tutorial2.html

It should be understood that the method of generating the surrogate is not limited to it, and any method known by those skilled in the art can be used, as long as the main codes of the artifact to be generated as a surrogate are maintained, and the important details are hidden.

The process of generating the surrogate of the embodiment will be described in details with the example of the interface of FoodOrder_Interface_FoodService shown above in FIG. 3.

The codes of implementing the interface of FoodOrder_Interface_FoodService are as follows:

```
package com.dcm.foodsystem;
import com.dcm.foodsystem.FoodOrder_Interface_FoodService;
import com.ibm.websphere.sca.Ticket;
import commonj.sdo.DataObject;
import com.ibm.websphere.sca.ServiceManager;
public class FoodSystem1Impl {
  /**
   * Default constructor.
   */
  public FoodSystem1Impl( ) {
    super( );
  }
  /**
   * Return a reference to the component service instance for this
   * implementation class. This method should be used when passing this service to a
   * partner reference or if you want to invoke this component service
   * asynchronously.
   *
   * @generated (com.ibm.wbit.java)
   */
  private Object getMyService( ) {
    return (Object) ServiceManager.INSTANCE.locateService("self");
  }
  /**
   * This method is used to locate the service for the reference named
   * "FoodOrder_Interface_FoodServicePartner". This will return an instance of
   * {@link FoodOrder_Interface_FoodService}. If you would like to use this
   * service asynchronously then you will need to cast the result to
   * {@link FoodOrder_Interface_FoodServiceAsync}.
   *
   * @generated (com.ibm.wbit.java)
   *
   * @return FoodOrder_Interface_FoodService
```

```
*/
public FoodOrder_Interface_FoodService
locateService_FoodOrder_Interface_FoodServicePartner( ) {
    return (FoodOrder_Interface_FoodService) erviceManager.INSTANCE.-
        .locateService("FoodOrder_Interface_FoodServicePartner");
}
/**
 * Method generated to support implemention of operation "check" defined for
 * WSDL port type named "interface.FoodOrder_Interface_FoodService".
 *
 * The presence of commonj.sdo.DataObject as the return type and/or as a
 * parameter type conveys that its a complex type. Please refer to the WSDL
 * Definition for more information on the type of input, output and
 * fault(s).
 */
public Boolean check(DataObject timeIntervalBO) {
System.out.println(timeIntervalBO);
Boolean result = locateService_FoodOrder_Interface_FoodServicePartner( )
        .check(timeIntervalBO);
System.out.println("result" + result);
return result;
}
/**
 * Method generated to support implemention of operation "notifyCollector"
 * defined for WSDL port type named
 * "interface.FoodOrder_Interface_FoodService".
 *
 * Please refer to the WSDL Definition for more information on the type of
 * input, output and fault(s).
 */
public String notifyCollector(String message) {
String result = locateService_FoodOrder_Interface_FoodServicePartner( )
        .notifyCollector(message);
    return result;
    }
}
```

In the process of generating the surrogate, implementation details of public Boolean check (DataObject timeIntervalBO) in the interface of FoodOrder_Interface_FoodService are hidden, and only the result "true" is returned. Although the "true" is used as the return result in the embodiment, it should be understood that either "true" or "false" can be used as the return result. In the actual operation, the developers can randomly set a default return result or amend the default return result in their codes, and test the codes developed by themselves based on the amended result. That is to omit

```
public Boolean check(DataObject timeIntervalBO) {
    System.out.println(timeIntervalBO);
    Boolean result =
    locateService_FoodOrder_Interface_FoodServicePartner( )
        .check(timeIntervalBO);
    System.out.println("result" + result);
    return result;
}
``` as
```
public Boolean check(DataObject timeIntervalBO) {
    return true;
}
```

Further, implementation details of public Boolean check (DataObject timeIntervalBO) in the interface of FoodOrder_Interface_FoodService are hidden, and only the result "null" is returned. That is to omit

```
public String notifyCollector(String message) {
    String result =
    locateService_FoodOrder_Interface_FoodServicePartner( )
        .notifyCollector(message);
    return result;
}
as
public String notifyCollector(String message) {
    return null;
}
```

Therefore, the codes of the surrogate generated for the interface of FoodOrder_Interface_FoodService are as follows:

```
package com.dcm.foodsystem;
import com.dcm.foodsystem.FoodOrder_Interface_FoodService;
import com.ibm.websphere.sca.Ticket;
import commonj.sdo.DataObject;
import com.ibm.websphere.sca.ServiceManager;
public class FoodSystem2Impl {
```

```
/**
 * Default constructor.
 */
public FoodSystem2Impl( ) {
    super( );
}
/**
 * Return a reference to the component service instance for this
 * implementation class. This method should be used when passing this service to a
 * partner reference or if you want to invoke this component service
 * asynchronously.
 *
 * @generated (com.ibm.wbit.java)
 */
private Object getMyService( ) {
return (Object) ServiceManager.INSTANCE.locateService("self");
}
/**
 * This method is used to locate the service for the reference named
 * "FoodOrder_Interface_FoodServicePartner". This will return an instance of
 * {@link FoodOrder_Interface_FoodService}. If you would like to use this
 * service asynchronously then you will need to cast the result to
 * {@link FoodOrder_Interface_FoodServiceAsync}.
 *
 * @generated (com.ibm.wbit.java)
 *
 * @return FoodOrder_Interface_FoodService
 */
public FoodOrder_Interface_FoodService
locateService_FoodOrder_Interface_FoodServicePartner( ) {
  return (FoodOrder_Interface_FoodService) ServiceManager.INSTANCE.-
     locateService("FoodOrder_Interface_FoodServicePartner");
}
/**
 * Method generated to support implemention of operation "check" defined for
 * WSDL port type named "interface.FoodOrder_Interface_FoodService".
 *
 * The presence of commonj.sdo.DataObject as the return type and/or as a
 * parameter type conveys that its a complex type. Please refer to the WSDL
 * Definition for more information on the type of input, output and
 * fault(s).
 */
public Boolean check(DataObject timeIntervalBO) {
    return true;
}
/**
 * Method generated to support implemention of operation "notifyCollector"
 * defined for WSDL port type named
 * "interface.FoodOrder_Interface_FoodService".
 *
 * Please refer to the WSDL Definition for more information on the type of
 * input, output and fault(s).
 */
public String notifyCollector(String message) {
    return null;
}
}
```

In the interface of FoodOrder_Interface_FoodService, public Boolean check (DataObject timeIntervalBO) and public Boolean public String notifyCollector (String message) are two methods of the interface, and all application logics are in these two methods. Other codes in the interface are auxiliary codes which make sure that the implementation of the interface can be run normally, which are the same as the implementation of different interfaces. Furthermore, the method, implementation details of which are needed to be hidden, is automatically chosen according to the definition of the interface in the method of the present invention, for example, the method "check" and the "notifyCollector" in the interface shown in FIG. 3 are automatically chosen and hidden, and other common codes are kept.

Although the process of generating the surrogate for the artifact of the embodiment is described with the example of the interface of FoodOrder_Interface_FoodService, the process is exemplary, and the present invention has no limitation on this, as long as the codes for implementing the method of the interface are deleted, the random data confirmed with the return type is created, and other codes are kept.

At last, in step 104, the physical artifact and the logical artifact are sent to the developer together.

Through the method for providing project development environment for a developer of the embodiment, the confidentiality of the project development is improved by generating the surrogate to make sure that every developer can not touch the whole content of the project. At the same time, the complete logical development environment is automatically provided for the developer, and the developer can freely invoke the depended artifacts. The present invention improves the development efficiency compared with the manual method.

Apparatus for Providing Project Development Environment for a Developer

Figure 5:
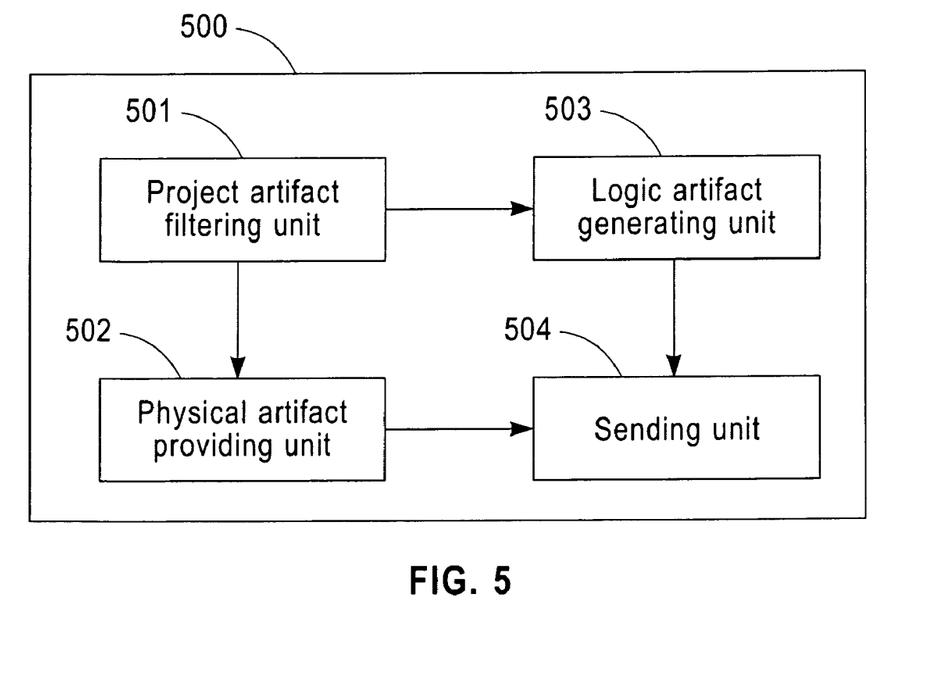
FIG. 5 is a block diagram showing an apparatus for providing project development environment for a developer according to an embodiment of the invention.

FIG. 5 is a block diagram showing an apparatus for providing project development environment for a developer according to an embodiment of the invention. Next, the embodiment will be described in conjunction with FIG. 5. For those same parts as the above embodiment, the description of which will be properly omitted.

FIG. 5 is a block diagram showing an apparatus for providing a project development environment for a developer according to an embodiment of the invention. Next, the embodiment will be described in conjunction with FIG. 5. For those same parts as the above embodiment, the description will be properly omitted.

Specifically, the request of the developer includes an identity (ID) of the developer or a name of an artifact with the ID of the developer. The ID of the developer can be identified based on a user name or an internet protocol (IP) address of the developer; and present invention has no limitation on this, as long as the ID of the developer can be identified.

In the embodiment, if the request of the developer includes the ID of the developer, the developer hopes to obtain all artifacts which can be accessed by the developer and all other artifacts which are depended by the artifacts. If the request is the name of the artifact with the ID of the developer, the developer only wants to obtain the particular artifact which can be accessed by the developer and other artifacts which are depended by the particular artifact.

In the embodiment, the artifact can be any entity which is produced in the process of the project development, such as an interface, a component/module and data and so on. The interface is a protocol defined for communicating between communication parties, which is implemented by the component. The component is the source code including application logic to achieve some functions. The data are data to be used by the component. FIG. 3 is an example of a project artifact according to the embodiment of the invention, which shows an interface of FoodOrder_Interface_FoodService. FIG. 4 is another example of a project artifact according to the embodiment of the invention, which shows the data of TimeIntervalBO.

It should be understood that the examples of the artifacts shown and enumerated here are just for the purpose of description, the present invention has no limitation on it, and the artifact can be any entity which is produced in the process of the project development.

In the embodiment, the project assignment information is information about the project partition and the project development. Before the project is developed, an administrator of the project needs to partition the project into a number of sub-projects, which are developed by different developers or different groups of developers. In the process of the project development, a developed artifact corresponds to a developer. Therefore, the project assignment information can be found in a table, which shows who develops which sub-project, i.e., which shows the mapping relationships between developers and artifacts.

In the embodiment, the project artifact dependencies are dependencies among artifacts which are produced in the process of the project development, i.e. the dependencies of one artifact with the other. FIG. 2 is an example of project artifact dependencies according to the embodiment of the invention. In FIG. 2, it shows the dependencies among interfaces, components and data, for example, component $C_3$ implements interface $I_3$ and invokes interface $I_4$ and interface $I_5$, and uses data $D_4$ and data $D_5$. It should be understood that FIG. 2 only exemplarily shows dependencies among project artifacts, and the present invention has no limitation on it.

In particular, the artifact which can be accessed by the developer is searched by the physical artifact providing unit 502 in a project repository, in which the searched artifact is used as the physical artifact.

In the embodiment, the project repository is a central storage unit for collectively storing any artifact produced in the process of the project development. Alternatively, the project repository stores not only artifacts themselves but also version information and changing situation of each artifact. Physically, the project repository can be realized by a single server, and also can be realized by a file management system of a version control system (VCS). The present invention has no limitation on the project repository, as long as it can store the artifact, and can provide the artifact when it is needed.

In particular, the artifact which cannot be accessed by the developer but is depended by the artifact which can be accessed by the developer is searched by the logical artifact generating unit 503 in the project repository. Then a surrogate is generated for the searched artifact wherein the surrogate is used as the logical artifact.

After the artifact invoked by the developer is searched, the implementation details of the searched artifact are hidden in the surrogate generated by the logical artifact generating unit 503, so that the developer can not see the details of the artifact but can use it. This way will not affect the execution of the artifact which depends on other artifacts.

In particular, for example, the existing technology of Java Emitter Templates (JET) can be used in the logical artifact generating unit 503, the details of which can be seen in the links [1]-[2] as follows:

[1] eclipse.org at jet_tutorial.html

[2] eclipse.org at jet_tutorial2.html

It should be understood that the logical artifact generating unit 503 of the present invention is not limited to this, and any generating unit known by those skilled in the art can be used, as long as the main codes of the artifact to be generated as a surrogate are maintained, and the important details are hidden.

The specific process of generating the surrogate of the logical artifact generating unit 503 is the same as the process of generating the surrogate described with the example of the interface of FoodOrder_Interface_FoodService shown above in FIG. 3, the detailed description of which is omitted here for clarity.

Through the apparatus 500 for providing project development environment for a developer of the embodiment, the confidentiality of the project is improved by generating the surrogate using the logical artifact generating unit 503 to make sure that every developer can not touch the whole content of the project. At the same time, the complete logical development environment is automatically provided for the developer, and the development efficiency is improved compared with the manual method.

Project Development System

Figure 6:
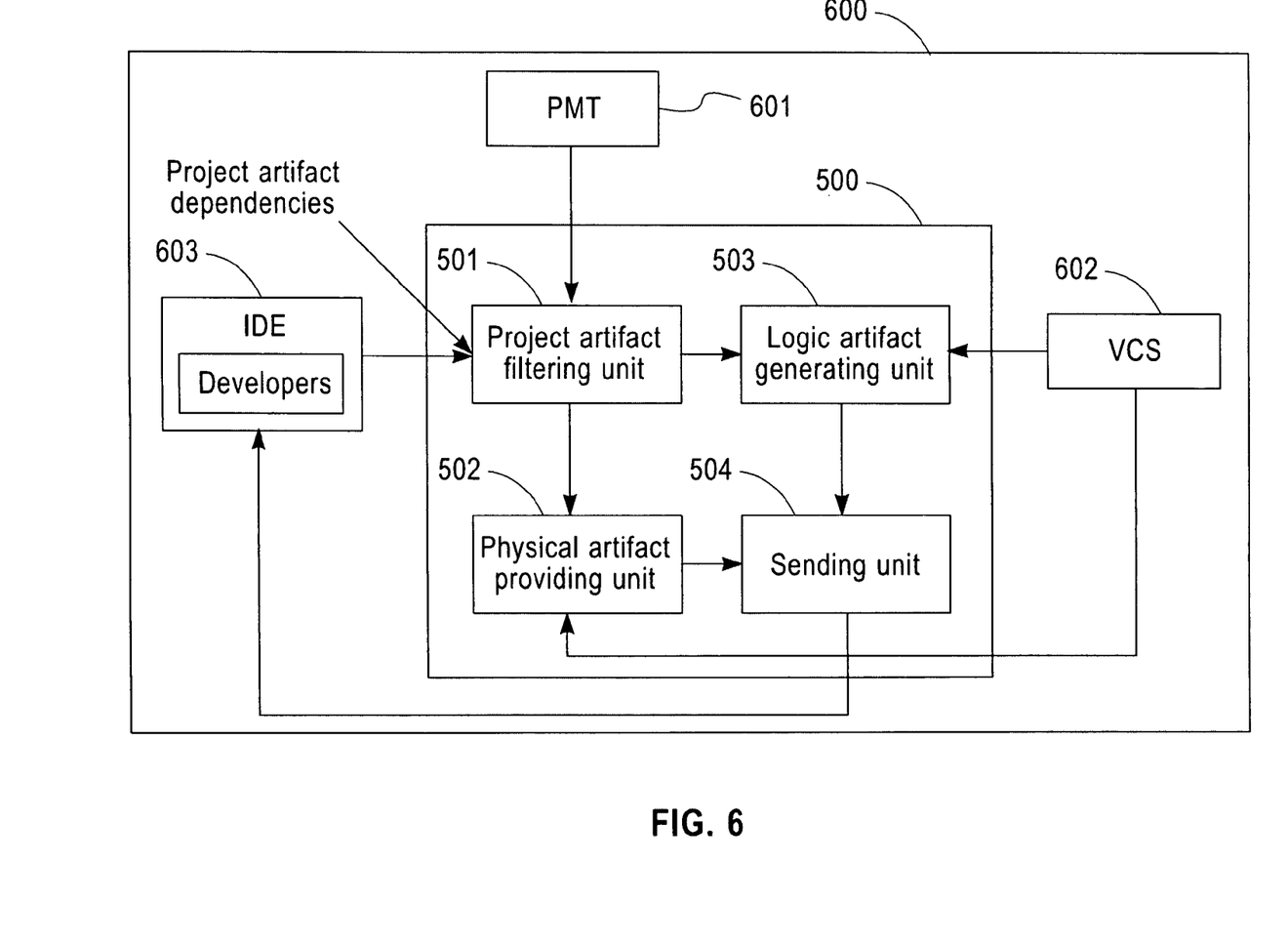
FIG. 6 is a block diagram showing a project development system according to an embodiment of the invention.

Under the same inventive conception, FIG. 6 is a block diagram showing a project development system according to an embodiment of the invention. Next, the embodiment will be described in conjunction with FIG. 5. For those same parts as the above embodiment, the description of which will be properly omitted.

As shown in FIG. 6, the project development system 600 of the embodiment comprises: a project management tool (PMT) 601 configured to assign a project and provide project assignment information; a version control system (VCS) 602 configured to manage and store artifacts generated in the project development process; an integrated development environment (IDE) 603 configured to develop the project by a developer; and the above-mentioned apparatus 500 configured to provide a logical development environment for a developer based on a request of the developer, project assignment information provided by the project management tool and project artifact dependencies.

In the embodiment, the project management tool (PMT) 601 can be any project management tool known by those skilled in the art, as long as a project can be partitioned into a number of sub-projects, and the project can be managed in the process of the project development. The version control system (VCS) 602 can be for example a VCS, Clear Case and CMVC and so on, and the present invention has no limitation on this, as long as the artifacts generated in the process of the project development can be managed and stored. The integrated development environment (IDE) 603 can be any development environment known by those skilled in the art, as long as it can be used by developers to develop the project.

The process of providing the integrated development environment for the developer by the project development system 600 of the embodiment is the same as that of the embodiment of the method and the apparatus, the detailed description of which is omitted here for clarity.

Through the project development system 600 of the embodiment, the confidentiality of the project development is improved by generating the surrogate to make sure that every developer can not touch the whole content of the project. At the same time, the complete logical development environment is automatically provided for the developer, and the development efficiency is improved compared with the manual method.

Furthermore, the project management tool (PMT), the version control system (VCS) and the integrated development environment (IDE) are integrated in the project development system 600 of the embodiment, thereby a whole, secure, and general development environment can be provided for the project development, and the development efficiency is great improved.

Unless otherwise mentioned, the functions of the present invention can be implemented by hardware or a combination of hardware and software. However, in a preferable embodiment, unless otherwise mentioned, these functions can be performed by a processor such as a computer or an electronic data processor with an integrated circuit coded, such as coded with a computer program. Generally, the method for implementing the embodiment of the present invention can be a part of an operating system or a specific application program, a program, a module, an object or an instruction sequence. The software of the present invention generally includes a plurality of instructions which can be converted by a local computer into machine readable instructions, thereby they are executable instructions. Furthermore, the program includes variables and a data structure which are kept in local memory or searched in a memory with respect to the program. Further, the programs mentioned below can be identified based on application methods for implementing them in the specific embodiment of the present invention.

Although the method for providing project development environment for a developer, the apparatus for providing project development environment for a developer and, and the project development system of the present invention has been described in detail through some exemplary embodiments, these embodiments are not exhaustive, various variations and modifications can be made therein by those skilled in the art without departing from the spirit and scope of the invention. Therefore, the present invention is not limited to these embodiments, the scope of which is only defined by accompany claims.

The invention claimed is:

1. A method for providing project development environment for a developer, comprising:
    determining artifacts which can be accessed by said developer and artifacts which cannot be accessed by said developer but are depended by said artifacts which can be accessed by said developer based on a request of said developer, project assignment information and project artifact dependencies;
    providing a physical artifact for said artifact which can be accessed by said developer;
    generating a logical artifact for said artifact which cannot be accessed by said developer but is depended by said artifact which can be accessed by said developer by searching a project repository for said artifact which cannot be accessed by said developer but is depended by said artifact which can be accessed by said developer and generating a surrogate for said artifact searched as the logical artifact, wherein the logical artifact is executable by the developer and wherein the implementing details of said artifact searched are hidden in the surrogate and cannot be accessed or altered by the developer; and
    sending said physical artifacts and said logical artifacts together to said developer.

2. The method according to claim 1, wherein said step of providing a physical artifact comprises:
    searching a project repository for an accessible artifact which can be accessed by said developer;
    wherein said accessible artifact is used as said physical artifact.

3. The method according to claim 1, wherein an artifact comprises any entity generated in a project development process.

4. The method according to claim 3, wherein said entity comprises at least one of an interface, a component and data.

5. The method according to claim 1, wherein said project assignment information comprises mapping relationships between developers and project artifacts.

6. The method according to claim 1, wherein said project artifact dependencies comprise invocation relationships among project artifacts.

7. An apparatus for providing project development environment for a developer, comprising:
    a computer processing device for executing units;
    a project artifact filtering unit configured to determine artifacts which can be accessed by said developer and artifacts which cannot be accessed by said developer but are depended by said artifact which can be accessed by said developer based on a request of said developer, project assignment information and project artifact dependencies;
    a physical artifact providing unit configured to provide a physical artifact for said artifact which can be accessed by said developer;
    a logical artifact generating unit configured to generate a logical artifact for said artifact which cannot be accessed by said developer and is depended by said artifact which can be accessed by said developer by searching a project repository for said artifact which cannot be accessed by said developer but is depended by said artifact which can be accessed by said developer and generating a surrogate for said artifact searched as the logical artifact, wherein the logical artifact is executable by the developer and wherein the implementing details of said artifact searched are hidden in the surrogate and cannot be accessed or altered by the developer; and a sending unit configure to send said physical artifact and said logical artifact together to said developer.

8. The apparatus according to claim 7, wherein said physical artifact providing unit comprises:

a searching unit configured to search a project repository for an accessible artifact which can be accessed by said developer;

wherein said accessible artifact searched is used as said physical artifact.

9. The apparatus according to claim 7, wherein said logical artifact generating unit comprises:

a searching unit configured to search a project repository for said artifact which cannot be accessed by said developer and is depended by said artifact which can be accessed by said developer; and a surrogate generating unit configured to generate a surrogate for said artifact searched;

wherein said surrogate is used as said logical artifact.

10. The apparatus according to claim 9, wherein said surrogate generating unit hides implementing details of said artifact searched by said searching unit.

11. The apparatus according to claim 7, wherein an artifact comprises any entity generated in a project development process.

12. The apparatus according to claim 11, wherein said entity comprises at least one of an interface, a component and data.

13. The apparatus according claim 7, wherein said project assignment information comprises mapping relationships between developers and project artifacts.

14. The apparatus according to claim 7, wherein said project artifact dependencies comprise invocation relationships among project artifacts.

15. A project development system, comprising:

a project management tool PMT configured to assign a project and provide project assignment information;

a version control system VCS configured to manage and store artifacts generated in a project development process;

an integrated development environment IDE configured to develop the project for a developer; and a project development apparatus comprising:

a computer processing device for executing units; a project artifact filtering unit configured to determine artifacts which can be accessed by said developer and artifacts which cannot be accessed by said developer but are depended by said artifact which can be accessed by said developer based on a request of said developer, project assignment information and project artifact dependencies; a physical artifact providing unit configured to provide a physical artifact for said artifact which can be accessed by said developer; a logical artifact generating unit configured to generate a logical artifact for said artifact which cannot be accessed by said developer and is depended by said artifact which can be accessed by said developer, by searching a project repository for said artifact which cannot be accessed by said developer but is depended by said artifact which can be accessed by said developer and generating a surrogate for said artifact searched as the logical artifact, wherein the logical artifact is executable by the developer and wherein the implementing details of said artifact searched are hidden in the surrogate and cannot be accessed or altered by the developer; and a sending unit configure to send said physical artifact and said logical artifact together to said developer.

* * * * *